Figure 1:
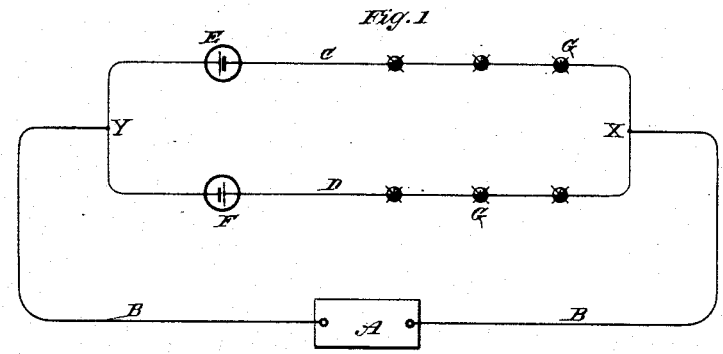

(No Model.) 3 Sheets—Sheet 1.

N. TESLA.
METHOD OF OBTAINING DIRECT FROM ALTERNATING CURRENTS.

No. 413,353. Patented Oct. 22, 1889.

Witnesses:
Raphaël Netter
Robt. F. Gaylord

Inventor
Nikola Tesla
By
Duncan, Curtis & Page
Attorneys.

(No Model.) 3 Sheets—Sheet 2.

N. TESLA.
METHOD OF OBTAINING DIRECT FROM ALTERNATING CURRENTS.

No. 413,353. Patented Oct. 22, 1889.

Witnesses:
Raphael Netter
Frank E. Hartley

Inventor
Nikola Tesla
By
Duncan, Curtis & Page
Attorneys.

(No Model.)  3 Sheets—Sheet 3.

N. TESLA.
METHOD OF OBTAINING DIRECT FROM ALTERNATING CURRENTS.

No. 413,353.  Patented Oct. 22, 1889.

Witnesses:
Raphael Netter
Frank E. Hartley

Inventor
Nikola Tesla
By
Duncan, Curtis & Page
Attorneys.

UNITED STATES PATENT OFFICE.

NIKOLA TESLA, OF NEW YORK, N. Y., ASSIGNOR OF TWO-THIRDS TO ALFRED S. BROWN, OF SAME PLACE, AND CHARLES F. PECK, OF ENGLEWOOD, NEW JERSEY.

METHOD OF OBTAINING DIRECT FROM ALTERNATING CURRENTS.

SPECIFICATION forming part of Letters Patent No. 413,353, dated October 22, 1889.

Application filed June 12, 1889. Serial No. 314,069. (No model.)

*To all whom it may concern:*

Be it known that I, NIKOLA TESLA, a subject of the Emperor of Austria, from Smiljan, Lika, border country of Austria - Hungary, temporarily residing in New York city, in the State of New York, have invented a certain new and useful Improvement in Methods of Obtaining Direct from Alternating Currents, of which the following is a specification, reference being had to the drawings accompanying and forming a part of the same.

In nearly all the more important industrial applications of electricity the current is produced by dynamo-electric machines driven by power, in the coils of which the currents developed are primarily in reverse directions or alternating; but as very many electrical devices and systems require direct currents, it has been usual to correct the current alternations by means of a commutator, instead of taking them off directly from the generating-coils.

The superiority of alternating-current machines in all cases where their currents can be used to advantage renders their employment very desirable, as they may be much more economically constructed and operated; and the object of this my present invention is to provide means for directing or converting at will at one or more points in a circuit alternating into direct currents.

Stated as broadly as I am able to express it, my invention consists in obtaining direct from alternating currents, or in directing the waves of an alternating current so as to produce direct or substantially direct currents by developing or producing in the branches of a circuit including a source of alternating currents, either permanently or periodically, and by electric, electro-magnetic, or magnetic agencies, manifestations of energy, or what may be termed active resistances of opposite electrical character, whereby the currents or current-waves of opposite sign will be diverted through different circuits, those of one sign passing over one branch and those of opposite sign over another.

I may consider herein only the case of a circuit divided into two paths, inasmuch as any further subdivision involves merely an extension of the general principle. Selecting, then, any circuit through which is flowing an alternating current, I divide such circuit at any desired point into two branches or paths. In one of these paths I insert some device to create an electro-motive force counter to the waves or impulses of current of one sign and a similar device in the other branch which opposes the waves of opposite sign. Assume, for example, that these devices are batteries, primary or secondary, or continuous-current dynamo-machines. The waves or impulses of opposite direction composing the main current have a natural tendency to divide between the two branches; but by reason of the opposite electrical character or effect of the two branches one will offer an easy passage to a current of a certain direction, while the other will offer a relatively high resistance to the passage of the same current. The result of this disposition is, that the waves of current of one sign will, partly or wholly, pass over one of the paths or branches, while those of the opposite sign pass over the other. There may thus be obtained from an alternating current two or more direct currents without the employment of any commutator such as it has been heretofore regarded as necessary to use. The current in either branch may be used in the same way and for the same purposes as any other direct current—that is, it may be made to charge secondary batteries, energize electro-magnets, or for any other analogous purpose.

In the drawings I have illustrated some of the various ways in which I may carry out this invention.

The several figures are diagrammatic in character, and will be described in detail in their order.

Figure 1 represents a plan of directing the alternating currents by means of devices purely electrical in character. Figs. 2, 3, 4, 5, 6, and 7 are diagrams illustrative of other ways of carrying out the invention, which will be hereinafter more particularly described.

In Fig. 1, A designates a generator of alternating currents, and B B the main or line circuit therefrom. At any given point in this circuit at or near which it is desired to obtain direct currents I divide the circuit B into two paths or branches C D. In each of these branches I place an electrical generator, which for the present we will assume produces direct or continuous currents. The direction of the current thus produced is opposite in one branch to that of the current in the other branch, or, considering the two branches as forming a closed circuit, the generators E F are connected up in series therein, one generator in each part or half of the circuit. The electro-motive force of the current sources E and F may be equal to or higher or lower than the electro-motive forces in the branches C D or between the points X and Y of the circuit B B. If equal, it is evident that current-waves of one sign will be opposed in one branch and assisted in the other to such an extent that all the waves of one sign will pass over one branch and those of opposite sign over the other. If, on the other hand, the electro-motive force of the sources E F be lower than that between X and Y, the currents in both branches will be alternating, but the waves of one sign will preponderate. One of the generators or sources of current E or F may be dispensed with; but it is preferable to employ both, if they offer an appreciable resistance, as the two branches will be thereby better balanced. The translating or other devices to be acted upon by the current are designated by the letters G, and they are inserted in the branches C D in any desired manner; but in order to better preserve an even balance between the branches due regard should be had to the number and character of the devices, as will be well understood.

Figure 2:
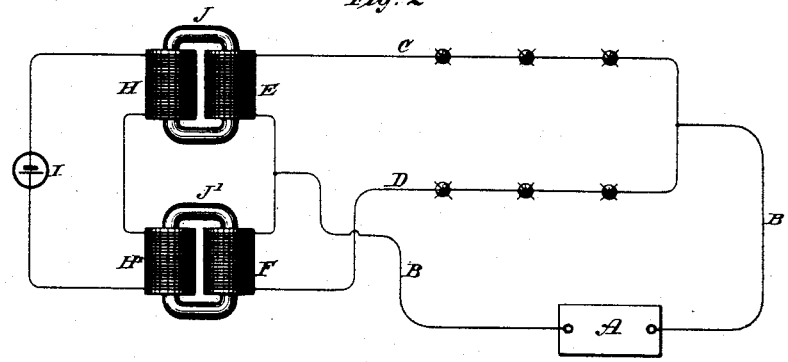

Figs. 2, 3, 4, and 5 illustrate what may be termed "electro-magnetic" devices for accomplishing a similar result—that is to say, instead of producing directly by a generator an electro-motive force in each branch of the circuit, I may establish a field or fields of force and lead the branches through the same in such manner that an active opposition of opposite effect or direction will be developed therein by the passage or tendency to pass of the alternations of current. In Fig. 2, for example, A is the generator of alternating currents, B B the line-circuit, and C D the branches over which the alternating currents are directed. In each branch I include the secondary of a transformer or induction-coil, which, since they correspond in their functions to the batteries of the previous figure, I have designated by the letters E F. The primaries H H' of the induction-coils or transformers are connected either in parallel or series with a source of direct or continuous currents I, and the number of convolutions is so calculated for the strength of the current from I that the cores J J' will be saturated. The connections are such that the conditions in the two transformers are of opposite character—that is to say, the arrangement is such that a current wave or impulse corresponding in direction with that of the direct current in one primary, as H, is of opposite direction to that in the other primary H'; hence it results that while one secondary offers a resistance or opposition to the passage through it of a wave of one sign the other secondary similarly opposes a wave of opposite sign. In consequence the waves of one sign will, to a greater or less extent, pass by way of one branch, while those of opposite sign in like manner pass over the other branch.

In lieu of saturating the primaries by a source of continuous current, I may include the primaries in the branches C D, respectively, and periodically short-circuit by any suitable mechanical devices—such as an ordinary revolving commutator—their secondaries. It will be understood of course that the rotation and action of the commutator must be in synchronism or in proper accord with the periods of the alternations in order to secure the desired results. Such a disposition I have represented diagrammatically in Fig. 3. Corresponding to the previous figures, A is the generator of alternating currents, B B the line, and C D the two branches for the direct currents. In branch C are included two primary coils E E', and in branch D are two similar primaries F F'. The corresponding secondaries for these coils and which are on the same subdivided cores J or J' are in circuits the terminals of which connect to opposite segments K K' and L L', respectively, of a commutator. Brushes $bb$ bear upon the commutator and alternately short-circuit the plates K and K' and L and L' through a connection $c$. It is obvious that either the magnets and commutator or the brushes may revolve.

The operation will be understood from a consideration of the effects of closing or short-circuiting the secondaries. For example, if at the instant when a given wave of current passes one set of secondaries be short-circuited, nearly all the current flows through the corresponding primaries; but the secondaries of the other branch being open-circuited the self-induction in the primaries is highest, and hence little or no current will pass through that branch. If, as the current alternates, the secondaries of the two branches are alternately short-circuited, the result will be that the currents of one sign pass over one branch and those of the opposite sign over the other. The disadvantages of this arrangement, which would seem to result from the employment of sliding contacts, are in reality very slight, inasmuch as the electro-motive force of the secondaries may be made exceedingly low, so that sparking at the brushes is avoided.

Figure 4:
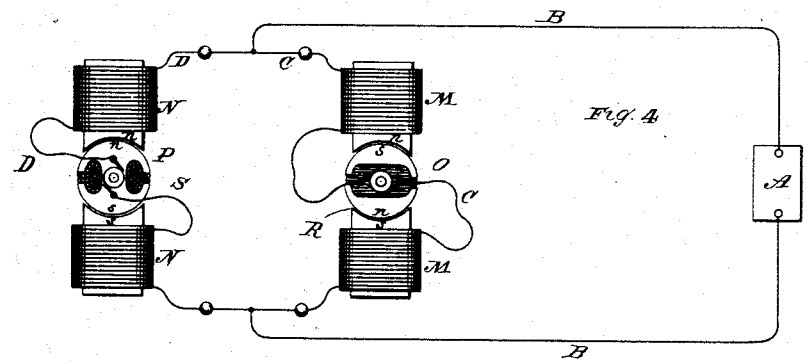

Fig. 4 is a diagram, partly in section, of another plan of carrying out the invention. The circuit B in this case is divided, as before, and each branch includes the coils of both the field and revolving armatures of two induction devices. The armatures O P are preferably mounted on the same shaft, and are adjusted relatively to one another in such manner that when the self-induction in one branch, as C, is maximum in the other branch D it is minimum. The armatures are rotated in synchronism with the alternations from the source A. The winding or position of the armature-coils is such that a current in a given direction passed through both armatures would establish in one poles similar to those in the adjacent poles of the field and in the other poles unlike the adjacent field-poles, as indicated by n n s s in the drawings. If the like poles are presented, as shown in circuit D, the condition is that of a closed secondary upon a primary, or the position of least inductive resistance; hence a given alternation of current will pass mainly through D. A half-revolution of the armatures produces an opposite effect, and the succeeding current impulse passes through C. Using this figure as an illustration, it is evident that the fields N M may be permanent magnets or independently excited and the armatures O P driven, as in the present case, so as to produce alternate currents, which will set up alternately impulses of opposite direction in the two branches D C, which in such case would include the armature-circuits and translating devices only.

Figure 3:
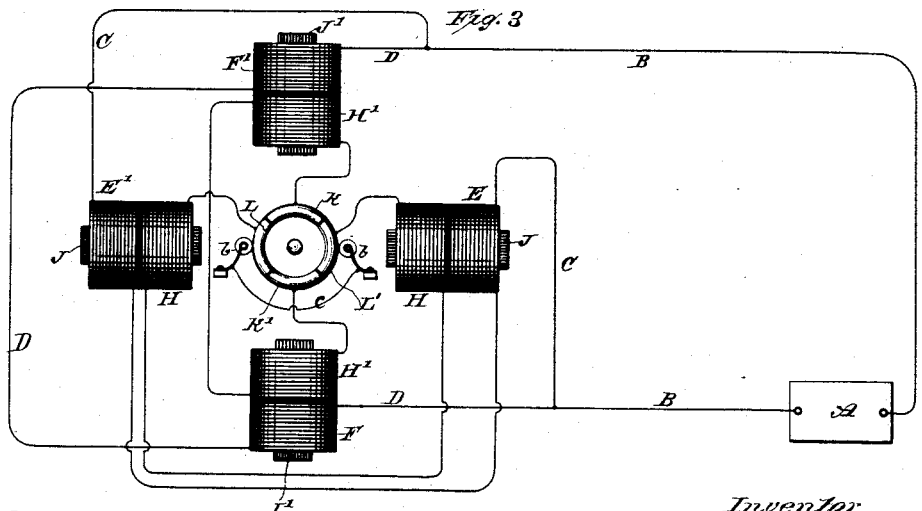
Figure 5:
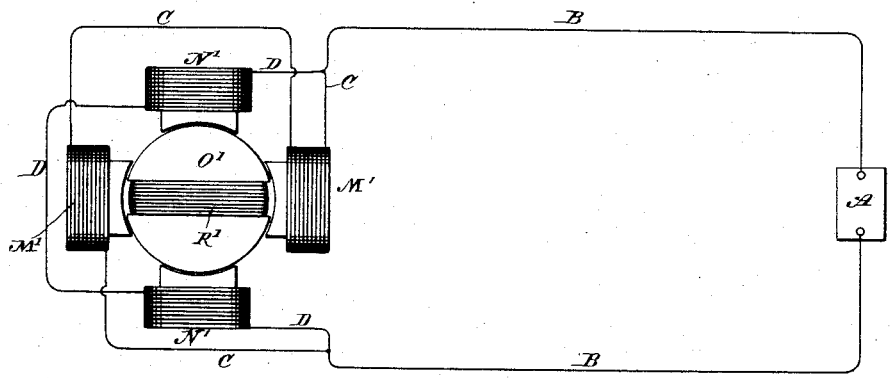

In Fig. 5 a plan alternative with that shown in Fig. 3 is illustrated. In the previous case illustrated each branch C and D contained one or more primary coils, the secondaries of which were periodically short-circuited in synchronism with the alternations of current from the main source A, and for this purpose a commutator was employed. The latter may, however, be dispensed with and an armature with a closed coil substituted.

Referring to Fig. 5, in one of the branches, as C, are two coils M', wound on laminated cores, and in the other branches D are similar coils N'. A subdivided or laminated armature O', carrying a closed coil R', is rotatably supported between the coils M' N', as shown. In the position shown—that is, with the coil R' parallel with the convolutions of the primaries N' M'—practically the whole current will pass through branch D, because the self-induction in coils M' M' is maximum. If, therefore, the armature and coil be rotated at a proper speed relatively to the periods or alternations of the source A, the same results are obtained as in the case of Fig. 3.

Figure 6:
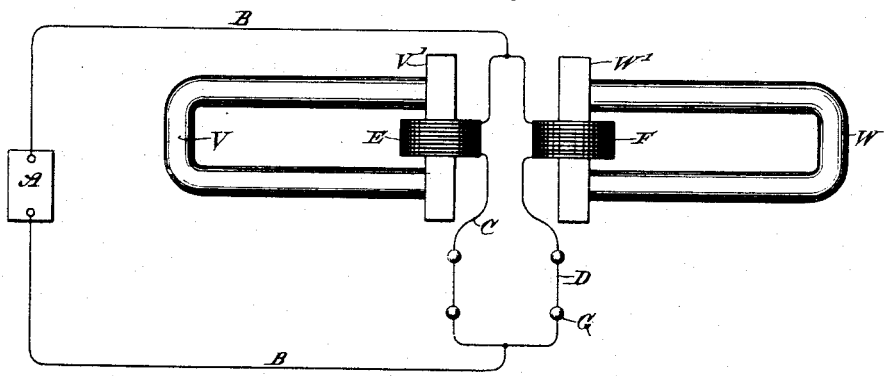
Figure 7:
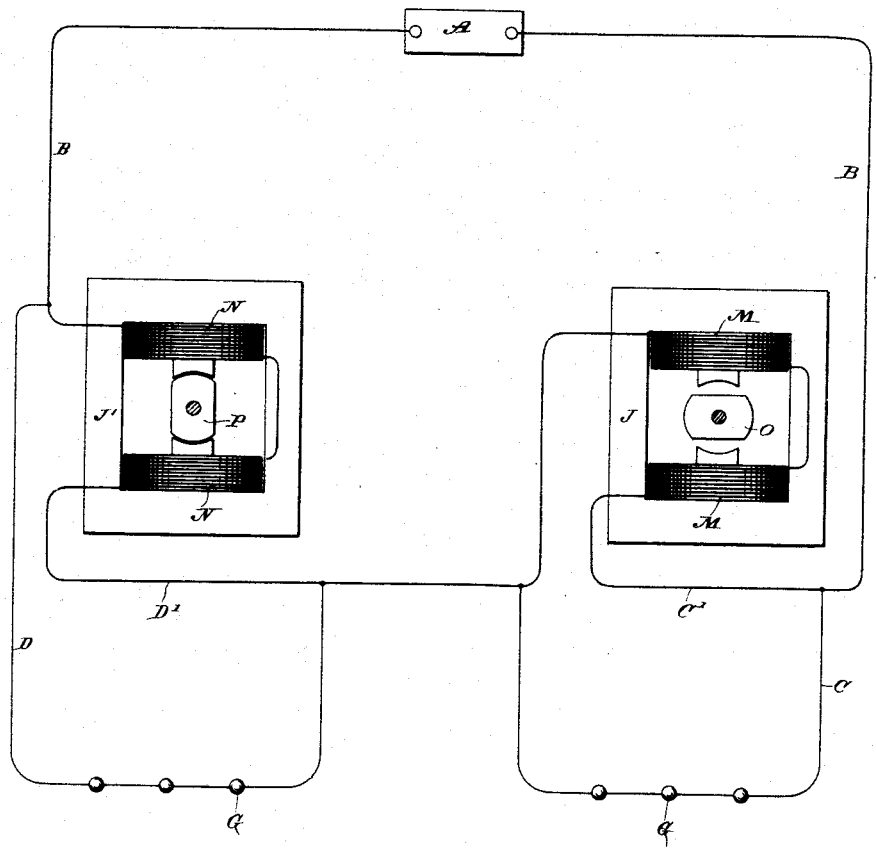

Fig. 6 is an instance of what may be called, in distinction to the others, a "magnetic" means of securing the results arrived at in this invention. V and W are two strong permanent magnets provided with armatures V' W', respectively. The armatures are made of thin laminæ of soft iron or steel, and the amount of magnetic metal which they contain is so calculated that they will be fully or nearly saturated by the magnets. Around the armatures are coils E F, contained, respectively, in the circuits C and D. The connections and electrical conditions in this case are similar to those in Fig. 2, except that the current source I of Fig. 2 is dispensed with and the saturation of the core of coils E F obtained from the permanent magnets.

In the illustrations heretofore given I have in each instance shown the two branches or paths containing the translating or induction devices as in derivation one to the other; but this is not always necessary. For example, in Fig. 7, A is an alternating-current generator; B B, the line wires or circuit. At any given point in the circuit I form two paths, as D D', and at another point two paths, as C C'. Either pair or group of paths is similar to the previous dispositions with the electrical source or induction device in one branch only, while the two groups taken together form the obvious equivalent of the cases in which an induction device or generator is included in both branches. In one of the paths, as D, are included the devices to be operated by the current. In the other branch, as D', is an induction device that opposes the current impulses of one direction and directs them through the branch D. So, also, in branch C are translating devices G, and in branch C' an induction device or its equivalent that diverts through C impulses of opposite direction to those diverted by the device in branch D'. I have also shown a special form of induction device for this purpose. J J' are the cores, formed with pole-pieces, upon which are wound the coils M N. Between these pole-pieces are mounted at right angles to one another the magnetic armatures O P, preferably mounted on the same shaft and designed to be rotated in synchronism with the alternations of current. When one of the armatures is in line with the poles or in the position occupied by armature P, the magnetic circuit of the induction device is practically closed; hence there will be the greatest opposition to the passage of a current through coils N N. The alternation will therefore pass by way of branch D. At the same time, the magnetic circuit of the other induction device being broken by the position of the armature O, there will be less opposition to the current in coils M, which will shunt the current from branch C. A reversal of the current being attended by a shifting of the armatures, the opposite effect is produced.

There are many other modifications of the means or methods of carrying out my invention; but I have not deemed it necessary herein to specifically refer to more than those described, as they involve the chief modifications of the plan. In all of these it will be observed that there is developed in one or all of the branches of a circuit from a source of alternating currents an active (as distinguished from a dead) resistance or opposition to the currents of one sign, for the purpose of diverting the currents of that sign through the other or another path, but permitting the currents of opposite sign to pass without substantial opposition.

Whether the division of the currents or waves of current of opposite sign be effected with absolute precision or not is immaterial to my invention, since it will be sufficient if the waves are only partially diverted or directed, for in such case the preponderating influence in each branch of the circuit of the waves of one sign secures the same practical results in many if not all respects as though the current were direct and continuous.

An alternating and direct current have been combined so that the waves of one direction or sign were partially or wholly overcome by the direct current; but by this plan only one set of alternations are utilized, whereas by my system the entire current is rendered available. By obvious applications of this discovery I am enabled to produce a self-exciting alternating dynamo, or to operate direct-current meters on alternating-current circuit, or to run various devices—such as arc lamps—by direct currents in the same circuit with incandescent lamps or other devices run by alternating currents.

It will be observed that if an intermittent counter or opposing force be developed in the branches of the circuit and of higher electro-motive force than that of the generator an alternating current will result in each branch, with the waves of one sign preponderating, while a constantly or uniformly acting opposition in the branches of higher electro-motive force than the generator would produce a pulsating current, which conditions would be under some circumstances the equivalent to those I have previously described.

What I claim as my invention is—

1. The method herein set forth of obtaining direct from alternating currents, which consists in developing or producing in one branch of a circuit from an alternating-current source an active resistance to the current impulses of one direction, whereby the said currents or waves of current will be diverted or directed through another branch.

2. The method of obtaining direct from alternating currents, which consists in dividing the path of an alternating current into branches, and developing in one of said branches, either permanently or periodically, an electrical force or active resistance counter to or opposing the currents or current-waves of one sign, and in the other branch a force counter to or opposing the currents or current-waves of opposite sign, as set forth.

3. The method of obtaining direct from alternating currents, which consists in dividing the path of an alternating current into branches, establishing fields of force and leading the said branches through the said fields of force in such relation to the lines of force therein that the impulses of current of one direction will be opposed in one branch and those of opposite direction in the other, as set forth.

NIKOLA TESLA.

Witnesses:
ROBT. F. GAYLORD,
F. B. MURPHY.